Sept. 9, 1952  T. H. THOMAS  2,609,905
CLUTCH CONTROL MECHANISM
Filed Oct. 26, 1945

INVENTOR.
THOMAS H. THOMAS
BY
ATTORNEY

Patented Sept. 9, 1952

2,609,905

UNITED STATES PATENT OFFICE 2,609,905

CLUTCH CONTROL MECHANISM

Thomas H. Thomas, South Bend, Ind., assignor to Bendix Aviation Corporation, South Bend, Ind., a corporation of Delaware Application October 26, 1945, Serial No. 624,801

4 Claims. (Cl. 192—91)

This invention relates to a power mechanism for operating the friction clutch of an automotive vehicle.

The principal object of the invention is to provide means for so controlling the clutch engaging operation of a pressure differential operated motor that the clutch plate loading during said engagement is proportional both to the R. P. M. of the engine of the vehicle and to the degree of acceleration of said engine. It follows therefore that with the clutch control mechanism of my invention installed in a car equipped with a friction clutch of standard construction the clutch plates of said clutch are automatically loaded to prevent an excessive increase in engine speed when the throttle is suddenly opened.

Yet another object of my invention is to provide, in a friction clutch control mechanism of an automotive vehicle, means for controlling the operation of a pressure balanced clutch control valve of said mechanism, said means being operable in accordance with both the degree of acceleration of the engine of the vehicle and the speed of said engine.

A further object of my invention is to provide, in an automotive clutch control mechanism including a control valve, means for controlling the operation of said valve, said means being operative, when the throttle of the car is depressed in a normal fashion, to effect an engagement of the clutch in accordance with the speed of the engine of the car, said means being also operative to effect an engagement of the clutch in accordance with the acceleration of the engine when the speed of the latter is suddenly increased, that is, when the throttle is opened in an abnormal manner.

A further object of my invention is to provide pressure differential operated power means for so controlling the operation of the friction clutch of an automotive vehicle as to effect a smooth engagement of the clutch and to hold down the speed of the engine of the vehicle despite a somewhat abnormal throttle opening operation of the accelerator during said clutch engaging operation.

Other objects of the invention and desirable details of construction will become apparent from the detailed description of the embodiment of the invention described in the specification to follow and disclosed in the accompanying drawings, in which.

Figure 1:
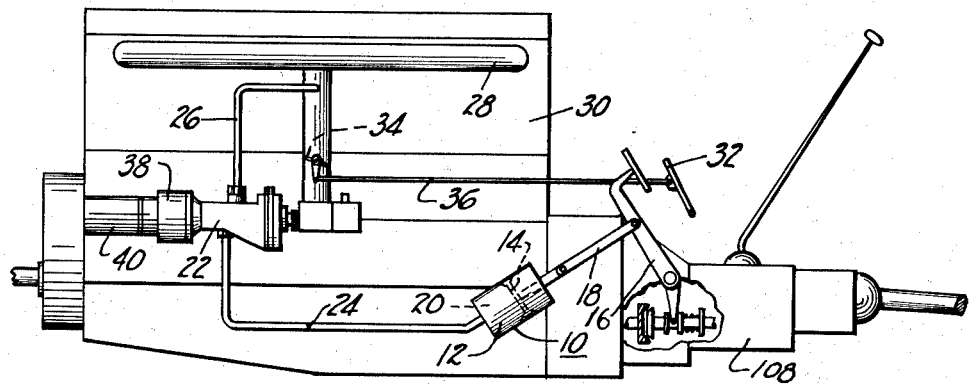
Figure 1 is a diagrammatic view of the principal features of the clutch control mechanism constituting my invention.

Referring now to Figure 1 of the drawings disclosing a preferred embodiment of my invention, a single acting pressure differential operated motor 10, including a cylinder 12 and a piston 14, is operably connected to a clutch controlling member 16 by a connection 18. The control chamber 20 of the motor, that is a chamber outlined by a portion of the cylinder and the piston 14, is placed in air transmitting connection with a pressure balanced three-way control valve 22, Figure 4, by means of a conduit 24; and a conduit 26 is provided to interconnect said valve with the intake manifold 28 of the internal combustion 30 of the automotive vehicle. The accelerator 32 of the vehicle is connected to the throttle 34 of the carburetor by means of a connection 36. The clutch pedal 16 is operably connected to a friction clutch, not shown, of standard construction, that is one including driving and driven plates biased into engagement with each other by yieldable means such as clutch springs. The motor 10 is controlled by the valve 22 to effect a disengagement of the clutch and a controlled engagement thereof. To effect this result there is provided the hereinafter described valve operating unit 38, Figure 2, which is preferably driven by the generator 40 of the car or other means, i. e. a governor, the speed of which is directly proportional to the speed of the engine; and this valve operating unit constitutes the essence of my invention.

Figure 4:
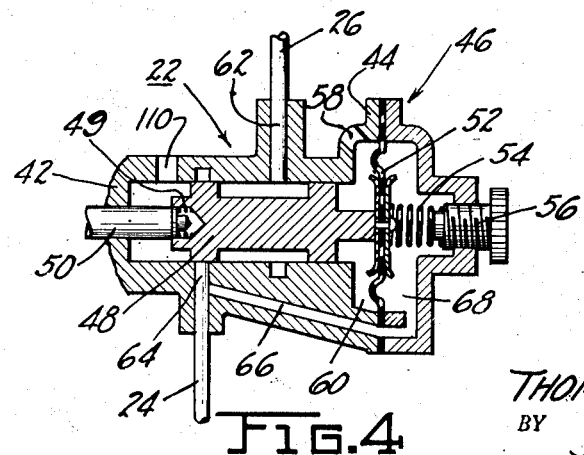
Figure 4 is a sectional view of the pressure balanced three way control valve of the clutch control mechanism of my invention.

Describing now the pressure differential operated control valve disclosed in detail in Figure 4 the same comprises a casing 42 enlarged at one end 44 to provide one-half of a valve operating pressure differential operated motor 46. A spool shaped reciprocable valve member 48, connected by means of a spring 49 to a rod 50, abuts one side of the power element 52 of the motor 46 and the other side of said power element is contacted by a spring 54 the compression of which is determined by a set screw 56 adjustably mounted in the casing of said motor. The motor casing is ported at 58 to vent a motor compartment 60 to the atmosphere and is also ported at 62 and 64 to receive respectively the aforementioned conduit 26 connected to the intake manifold and the aforementioned conduit 24 connected to the clutch operating motor 10; and said motor casing is also provided with a duct 66 serving to interconnect a control compartment 68 of the valve operating motor with the port 64.

Figures 2, 3:
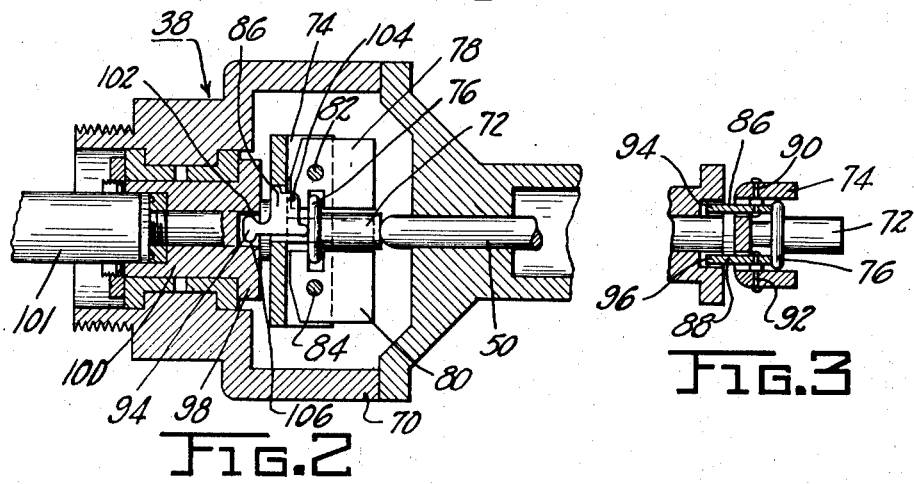
Figure 2 is a sectional view of the valve operating unit constituting the heart of my invention.
Figure 3 is a sectional view of a portion of the control unit of Figure 2 said view disclosing the inertia operated levers constituting an important feature of my invention.

Referring now to Figures 2 and 3 disclosing details of the valve operating unit constituting the heart of my invention, this unit includes a two-part casing 70 which may be detachably secured to the generator 40 of the power plant. The aforementioned valve operating rod 50 is slidably mounted in one part of the casing 70 and abuts a thrust member 72 which extends within a channel member 74. A flange 76 on the thrust member fits within slots in centrifugally operated flyweight members 78 and 80 said members being pivotally mounted, by pins 82 and 84, respectively, to said channel member.

An important feature of my invention lies in the provision of inertia operated lever members 86 and 88 pivotally mounted, by pins 90 and 92 respectively, to the channel member 74. The lever member 86 includes a leg member 94 and the lever member 88 includes a leg member 96; and each leg member fits loosely within a slot in an end flange 98 of a drive shaft 100 said shaft being operably connected by a shaft 101 to the generator 40 to be driven thereby. The R. P. M. of the shaft 100 is directly proportional to the R. P. M. of the internal combustion engine; accordingly, the drive shaft may, if desired, be driven by any engine driven mechanism other than the generator. It is important to note at this juncture that the valve spring 54, Figure 4, serves through the intermediary of the rod 50, to bias the end 94 of the leg 86 into contact at 102 with one side of the slot in the flange 98 within which it fits; and the leg 96 is, of course, also so positioned within its slot in the flange 98. Now as explained in greater detail hereinafter when the drive shaft 100 is sufficiently accelerated in the direction of the arrow, Figure 2, then the lever 86 rotates about its pivot 90 to take up the lost motion at 106; for all normal operations of the clutch control mechanism the lever members 86 and 88 serve as drive means between the drive shaft 100 and the channel member 74. It is to be noted here, however, that in lieu of the above described loose fit connection between the legs 94 and 96 and the slots in the flange 98 said legs may be contoured so that the same will fit snugly within said slots. The necessary construction is that the levers be capable of angular movement about their pivotal supports when the drive shaft 100 is accelerated at a certain factor.

Describing now the operation of the above described clutch control mechanism constituting my invention it will be assumed that the accelerator of the car is released to idle the engine. As is well known to those skilled in this art with this operation there is effected a relatively low gaseous pressure within the intake manifold 28. Now the construction and arrangement of the parts of my clutch control mechanism, including among other factors the loading of the springs 54 the size of the weights 78 and 80 and the area of the diaphragm 52, is preferably such that when the accelerator is released to idle the engine and said engine is neither driving the driven clutch plate or being driven thereby then the valve member 48, assumes the lapped position disclosed in Figure 4 thereby cutting off the connection between the motor 10 and both the atmosphere and source of vacuum. The construction and arrangement of the parts of the clutch control mechanism of my invention is also preferably such that at this time the gaseous pressure within the compartment 68 of the motor 46 is equal to the gaseous pressure within the control compartment 20 of the clutch operating motor 10 the latter being then operative to separate the driving and driven clutch plates a slight distance, that is, effect a disengagement of the clutch.

To engage the clutch, say after an operation of the change speed transmission 108 of the vehicle, the driver will depress the accelerator to open the throttle 34 to speed up the engine; and this operation results in a corresponding speeding up of the channel member 74 the drive being taken through the lever members 86 and 88. The flyweights 78 and 80 then become operative, through the intermediary of the thrust member 72, to move the rod 50 and valve member 48 connected thereto to the right, Figure 4, to vent the clutch motor 10 to the atmosphere via a port 110, port 64 and conduit 24. Assuming now that the driver so operates the accelerator as to maintain a certain engine speed then the movement of the valve member 48 will be arrested. Air then flows into the motor 10 to effect a clutch engaging operation thereof and at the same time air flows into the motor compartment 68 of the motor 46 via the duct 66. Now the gaseous pressure within the compartment 68 is by this operation increased resulting in a lowering of the differential of pressures to which the diaphragm 52 is subjected; and this operation brings into play the spring 54 to move the valve member to the left, Figure 4. It follows therefor that the lowering of the differential of pressures tending to move the valve member to the left is compensated for by the above described increase in force from the weights 78 and 80 tending to move said member to the right; and as a result the valve member 48 is moved back to its lapped position by the spring 54; that is the position disclosed in Figure 4. There is thus provided a pressure balanced valve means operative to effect a clutch plate loading which is proportional to the speed of the engine; for with each subsequent increase in engine speed to unseat the valve member 48, that is again vent the clutch motor to the atmosphere, there results a decrease in the differential of pressures acting upon the diaphragm 52 to thereby effect another lapping of the valve.

Discussing now the most important feature of my invention it is to be remembered as mentioned above that the spring 54 normally serves to maintain the legs 94 and 96 of the lever members 86 and 88 in contact with one edge of the slots in the flange 98 to thereby make possible the drive between the shaft 100 and the channel plate 74; and there results the above described operation of the centrifugal weights whereby the clutch plates are engaged with a loading which increases as the engine speed increases. Now in driving the car if the driver should inadvertently or by design tramp hard upon the accelerator there would result a sudden speeding up of the engine and by virtue of the inertia of the parts and friction the mechanism would, during this unusual operation of the engine, possibly fail to operate as described above, that is, effect an engagement of the clutch proportionate to engine speed. The engine then would momentarily race inasmuch as there would probably be a lag in the clutch engaging operation of the mechanism. Now the above described inertia, that is, pendulum operation of the levers 86 and 88 obviates this undesirable operation of the mechanism; for when the drive shaft 100 is accelerated to a degree over and above that necessary to overcome the sum of the mass of the parts and a certain frictional resistance to movement of said parts then said levers are rotated to take up the lost motion at 106 and the rod 50 is subjected to a force tending to move the valve member 48 to vent the clutch motor to the atmosphere, that is, initiate the clutch engaging operation thereof; and it is to be noted that this force results solely from the rotational acceleration of the drive shaft 100. The rod 50 is at this time also subject to the force resulting from the operation of the flyweights 78 and 80; accordingly, the valve opening movement of said rod is the resultant of the sum of these two forces. It is to be noted here that the force in pounds necessary to effect this particular inertia operation of the valve is equal to the product of the resistance to movement of the parts measured in pounds, that is, the mass of the parts plus friction, times the acceleration factor. In other words, the formula force equals mass times acceleration is applicable here.

It is apparent therefore that with the mechanism of my invention when the driver suddenly opens the throttle, that is effects an unusual operation thereof, there results a clutch engaging operation of the control valve 48 to effect an engagement of the clutch preventing an undesirable racing of the engine; for a racing of the engine is prevented when the clutch is relatively severely engaged and the latter operation is effected by the above described inertia operation of the levers 86 and 88. It is also apparent that with the mechanism of my invention there is provided means for disengaging the clutch when the the engine is idled to a certain R. P. M. and for effecting an engagement of the clutch with a clutch plate loading proportional to the engine speed, that is, proportional to the engine torque. The latter operation is, of course, highly desirable in the control of the power plant of an automotive vehicle.

With the mechanism of my invention, that is, with a mechanism wherein the degree of engagement of the clutch is a function of the acceleration of the engine, there will, of course, be less delay in effecting said engagement than if the engagement were solely a function of the speed of the engine; for if the latter were true that is if the control mechanism of the control unit 38 included only the centrifugally operated weights 78 and 80, then the engine speed would be increased before the clutch could be engaged. However, with the inertia operated weights 86 and 88 constituting a part of the control unit the clutch is engaged to prevent an undesirable racing of the engine when the throttle is suddenly opened.

It is thought that the invention and many of its attendant advantages will be understood from the foregoing description and it will be apparent that various changes may be made in the form, construction and arrangement of the parts without departing from the spirit and scope of the invention or sacrificing all of its material advantages, the form hereinbefore described being merely a preferred embodiment.

I claim:

1. Power means for operating the friction clutch of an automotive vehicle, including a clutch controlling member, a pressure differential operated motor operably connected to said member, a three-way balanced valve mechanism for controlling the operation of said motor including a reciprocable valve member movable to a valve open position to effect a clutch disengaging operation of the motor, to a valve closed position to initiate a clutch engaging operation of the motor and to a valve lapped position to effect an operation of the motor to maintain the then existing engagement of the clutch, said power means further including a combined speed and acceleration controlled unit for controlling the operation of said valve member including, a drive shaft, a thrust member, a centrifugally operated speed device and an inertia operated means having separate steps of operation to initially control the movement of the thrust member relative to the operation of the centrifugal speed device to interconnect the shaft, thrust member and the reciprocable valve member.

2. Power means for operating the friction clutch of an automotive vehicle, including a clutch controlling member, a pressure differential operated motor operably connected to said member, and a valve mechanism for controlling the operation of said motor, said power means further including a combined speed and acceleration controlled unit for controlling the operation of said valve member said unit including a drive shaft operably connected to the engine of the vehicle, a thrust member adapted to be operably connected to said valve member and means for interconnecting said shaft and thrust member including separate means concurrently responsive to both the R. P. M. of the drive shaft and the rotational acceleration thereof.

3. Power means for operating the friction clutch of an automative vehicle including a clutch controlling member, a pressure differential operated motor operably connected to said member, a three-way balanced valve mechanism for controlling the operation of said motor, and means for controlling the operation of the valve mehanism including a combined speed and acceleration controlled unit including a drive shaft driven by the engine of the vehicle, a thrust member adapted to be operably connected to the valve member and means interconnecting the thrust member and drive shaft including a channel member having centrifugally operated weights pivotally connected thereto, said weights being operative to exert a valve operating load upon said thrust member, said interconnecting means further including lever members independently operative in accordance with the rotational acceleration of the drive shaft and constituting a driving connection between said channel member and drive shaft.

4. In an automotive vehicle provided with a friction clutch, power means for operating said clutch comprising a pressure differential operated motor, and means for controlling the gaseous presure within the motor to control the operation of the clutch including a balanced valve mechanism comprising a reciprocable valve member, a pressure differential and spring operated motor for exerting a load upon one end of said valve member, a thrust member for exerting a load upon the other end of said valve member, and means including inertia operated means and centrifugally operated means each acting in definite sequence for exerting a load upon one end of said thrust member.

THOMAS H. THOMAS.

REFERENCES CITED

The following references are of record in the file of this patent:

UNITED STATES PATENTS

| Number | Name | Date |
|---|---|---|
| 2,144,074 | Mayback | Jan. 17, 1939 |
| 2,160,051 | Ainsworth | May 30, 1939 |
| 2,208,865 | Gette | July 23, 1940 |
| 2,228,612 | Sanford | Jan. 14, 1941 |
| 2,234,314 | Nicole | Mar. 11, 1941 |
| 2,324,830 | Eaton | July 20, 1943 |
| 2,328,091 | Nutt et al. | Aug. 31, 1943 |
| 2,362,242 | Casler | Nov. 7, 1944 |
| 2,381,786 | Tyler | Aug. 7, 1945 |